United States Patent [19]

Tsuzuki et al.

[11] Patent Number: 4,789,892

[45] Date of Patent: Dec. 6, 1988

[54] COLOR ADJUSTING DEVICE INCLUDING MATRIX-MASKING CIRCUITRY

[75] Inventors: Toshiyuki Tsuzuki; Masato Toho, both of Kanagawa, Japan

[73] Assignee: Fuji Xerox Co., Ltd., Tokyo, Japan

[21] Appl. No.: 945,547

[22] Filed: Dec. 23, 1986

[30] Foreign Application Priority Data

Dec. 23, 1985 [JP] Japan ................... 60-290127
Dec. 23, 1985 [JP] Japan ................... 60-290128

[51] Int. Cl.$^4$ ................... H04N 1/46; H04N 1/40
[52] U.S. Cl. ................... 358/80; 358/75
[58] Field of Search ................... 358/80, 75, 78

[56] References Cited

U.S. PATENT DOCUMENTS

| | | | |
|---|---|---|---|
| 3,739,078 | 6/1973 | Pugsley et al. | 358/80 |
| 3,876,824 | 4/1975 | Hipwell | 358/80 |
| 4,092,668 | 5/1978 | Knop | 358/80 |
| 4,204,223 | 5/1980 | Gast et al. | 358/80 |
| 4,402,007 | 8/1983 | Yamada | 358/75 |
| 4,403,249 | 9/1983 | Knop et al. | 358/80 |
| 4,414,636 | 11/1983 | Ueda et al. | 364/526 |

FOREIGN PATENT DOCUMENTS 50-14845 5/1975 Japan.
58-181045 9/1983 Japan.

Primary Examiner—James J. Groody
Assistant Examiner—Robert M. Bauer
Attorney, Agent, or Firm—Finnegan, Henderson, Farabow, Garrett and Dunner

[57] ABSTRACT

Color adjustment factors are set according to the color separation signals of an original picture and factors for each separation signal set equal to the absolute value of the sum of the factors corresponding to the other separation signals but of opposite polarity adjustment factors. The color separation signals and the color adjustment data are added to the output densities which are provided before color adjustment so that the color adjustment can be achieved.

5 Claims, 6 Drawing Sheets

COLOR ADJUSTING DEVICE INCLUDING MATRIX-MASKING CIRCUITRY

BACKGROUND OF THE INVENTION

This invention relates generally to a color adjusting device and related method for adjusting the color of a document to be photocopied by a color photocopy machine which makes use of standard integrated circuit components to reduce the number of mathematical operations performed by the device.

A known color scanner used for color adjustment is designed to carry out a basic masking operation wherein ink color is prevented from being improperly absorbed and the characteristic colors in the original document can be modified depending on the color distortion in the original or the viewer's preference. When masking is used in order to prevent color from being improperly absorbed, a white color signal is allowed to permeate through each filter of red (R), green (G), and blue (B) and a black color signal (K) which is being absorbed is submitted to toning by means of a yellow color adjustment (Y), magenta color adjustment (M), and a cyan color adjustment (C). When masking is used in order to modify the colors of an original document, six hues of Y, M, C, B, G and R are subjected to toning by means of Y, M, C and K color adjustments.

In a conventional color adjustment device, such as those disclosed in Japanese Pat. No. 14845/75 and Japanese patent application No. 181045/83, the number of adjustments needed is great (from 6 to 32) and, because the color adjustment must be made on a number of color separation bases (Y, M, C and K), complex circuitry is needed to perform the complex mathematical operations needed to obtain the resultant color-adjusted document intended for the viewer.

SUMMARY OF THE INVENTION

It is an object of the present invention to provide a color adjusting device utilizing a simpified circuit design and routine mathematical operations.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the color adjusting device, for adjusting the colors in an original picture, the colors of the original picture being separated to obtain non-color adjusted input color separation signals, comprises matrix masking circuit means for performing matrix masking on the input color separation signals to obtain output density signals of the colors of the original picture; decision output circuit means for performing an additional operation on the input color separation signals and for performing a subtraction operation on the color separation signals to output a plurality of color decisions representing the presence of regions of color in the original picture; color adjusting factor circuit means for outputting, for each of said colors, a first adjustment to increase the density of a predetermined color and a second adjustment to decrease the density of a predetermined color, respectively; a color adjusting masking circuit means for performing a mathematical calculation in response to signals from the color adjusting factor circuit means and the decision output circuit means to obtain a color adjustment change for each of the colors; and adder circuit means for adding the outputs of the matrix masking circuit to the outputs of the color adjusting masking circuit means to provide output density signals of the colors of a color-adjusted picture.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

Figure 1:
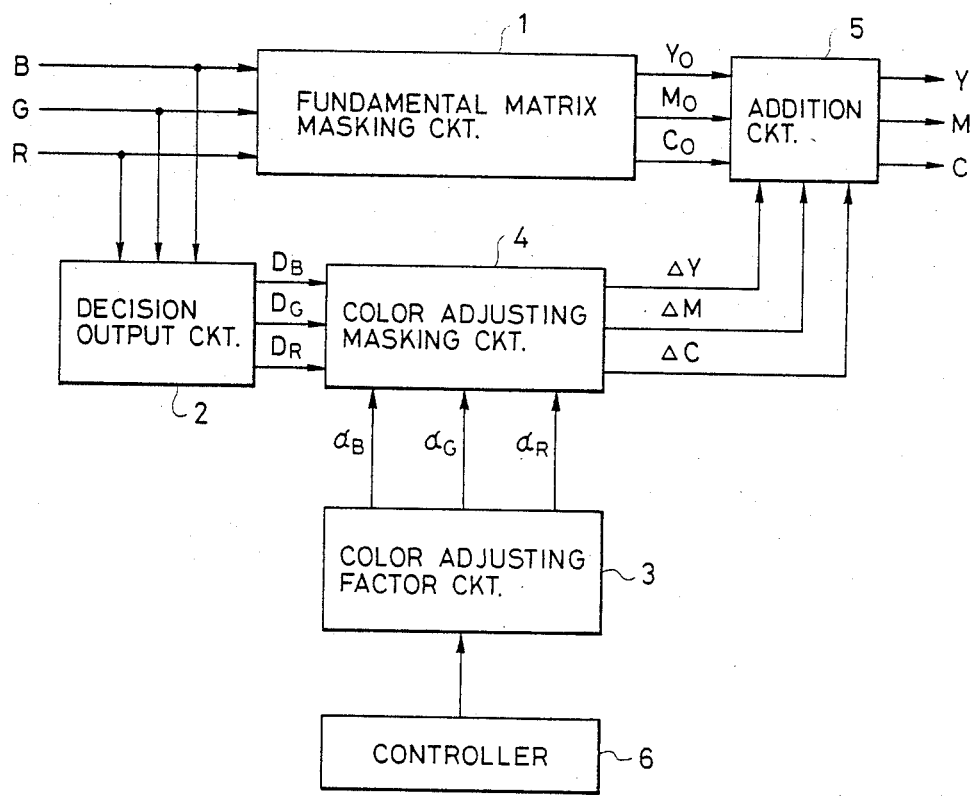
FIG. 1 is a block diagram of a color adjusting device constructed in accordance with the present invention.

A color adjusting device according to the invention, as shown in FIG. 1, includes a fundamental matrix masking circuit 1; a color decision output circuit 2; a color adjusting factor circuit 3; a color adjusting masking circuit 4; an addition circuit 5; and a controller 6.

A color separation signal of an original document is submitted to shading correction, conversion to equivalent neutral density (END) and other necesary pretreatments in order to achieve input density signals, B, G, and R. The fundamental matrix masking circuit 1 has as its inputs B, G, and R, which represent input color densities (or separation signals) of blue, green, and red in an original document. The circuitry of matrix masking circuit 1 is preselected to provide a matrix of color correction factors, such as $a_{11}$ through $a_{39}$, in the following exemplary format:

$$\begin{pmatrix} a_{11} & a_{12} & a_{13} & \ldots & a_{19} \\ a_{21} & a_{22} & a_{23} & \ldots & a_{29} \\ a_{31} & a_{32} & a_{33} & \ldots & a_{39} \end{pmatrix}$$

The output of fundamental matrix masking circuit 1 in the form of output densities of color before color adjustment is obtained by solving the following equation:

$$\begin{pmatrix} Y_0 \\ M_0 \\ C_0 \end{pmatrix} = \begin{pmatrix} a_{11} & a_{12} & a_{13} & \cdots & a_{19} \\ a_{21} & a_{22} & a_{23} & \cdots & a_{29} \\ a_{31} & a_{32} & a_{33} & \cdots & a_{39} \end{pmatrix} \begin{pmatrix} B \\ G \\ R \end{pmatrix} \quad (1)$$

where $Y_0$, $M_0$ and $C_0$ represent output color densities for color adjustment.

The color adjusting factor circuit 3 includes circuitry to provide the color adjustment factors $\alpha_B$, the blue color adjustment factor, $\alpha_G$, the green color adjustment factor, and $\alpha_R$, the red color adjustment factor. Color adjusting factor circuit 3 applies the color adjustment factors to the color adjusting masking circuit 4 in response to a signal from controller 6.

The color decision output circuit 2 is adapted to calculate the color decision outputs $D_B$, $D_G$, and $D_R$ by solving the following equation:

$$\begin{pmatrix} Y \\ M \\ C \end{pmatrix} = \begin{pmatrix} Y_0 \\ M_0 \\ C_0 \end{pmatrix} + \begin{pmatrix} \Delta Y \\ \Delta M \\ \Delta C \end{pmatrix}$$

$$= \begin{pmatrix} a_{11} & a_{12} & a_{13} & \cdots & a_{19} \\ a_{21} & a_{22} & a_{23} & \cdots & a_{29} \\ a_{31} & a_{32} & a_{33} & \cdots & a_{39} \end{pmatrix} \begin{pmatrix} B \\ G \\ R \end{pmatrix} +$$

$$\begin{pmatrix} -\alpha'_B & \alpha_G & \alpha_R \\ \alpha_B & -\alpha'_G & \alpha'_R \\ \alpha_B & \alpha_G & \alpha'_R \end{pmatrix} \begin{pmatrix} D_B \\ D_G \\ D_R \end{pmatrix}$$

where $D_B = -2B + G + R$, $D_G = B - 2G + R$, and $D_R = B + G - 2R$, and where $D_B$ represents a blue region decision in the original, $D_G$ represents a green region decision in the original, and $D_R$ represents a red region decision in the original. Also, $D_B$, $D_G$ and $D_R$ are defined as follows:

when $D_B < 0$, $D_B = 0$ (or $\alpha_B = 0$)

when $D_G < 0$, $D_G = 0$ (or $\alpha_G = 0$)

when $D_R < 0$, $D_R = 0$ (or $\alpha_R = 0$) $\quad (3)$

The color adjusting masking circuit 4 utilizes the output signals of decision output circuit 2 multiplied by the color adjustment factors provided for by the color adjusting factor circuit 3 to obtain the color adjustments $\Delta Y$, $\Delta M$, and $\Delta C$ as shown in the following equation:

$$\begin{pmatrix} \Delta Y \\ \Delta M \\ \Delta C \end{pmatrix} = \begin{pmatrix} 2\alpha'_B + \alpha_G + \alpha_R & -\alpha'_B + 2\alpha_G + \alpha_R & -\alpha'_B + \alpha_G - 2\alpha_R \\ -2\alpha_B - \alpha'_G + \alpha_R & -\alpha_B + 2\alpha'_G + \alpha_R & -\alpha_B - \alpha'_G - 2\alpha_R \\ -2\alpha_B + \alpha_G - \alpha'_R & \alpha_B - 2\alpha_G - \alpha'_R & \alpha_B + \alpha_G + 2\alpha'_R \end{pmatrix} \begin{pmatrix} B \\ G \\ R \end{pmatrix} \quad (4)$$

$$= \begin{pmatrix} -\alpha'_B & \alpha_G & \alpha_R \\ \alpha_B & -\alpha_G & \alpha_R \\ \alpha_B & \alpha_G & -\alpha_R \end{pmatrix} \begin{pmatrix} -2 & 1 & 1 \\ 1 & 1 & -2 \\ 1 & 1 & -2 \end{pmatrix}$$

where $\alpha_B$ and $\alpha'_B$, $\alpha_G$ and $\alpha'_G$, and $\alpha_R$ and $\alpha'_R$ are blue, green and red color adjustment factors, respectively, which are adjustable independently and where $\alpha'_B = -m_B\alpha_B$; $\alpha'_G = m_G\alpha_G$; and $\alpha'_R = m_R\alpha_R$.

In the addition circuit 5, the output densities $Y_0$, $M_0$ and $C_0$, outputted by the fundamental matrix masking circuit 1 are added to the color adjustments $\Delta Y$, $\Delta M$, and $\Delta C$ provided by the color adjusting masking circuit 4, respectively, to obtain the output density signals Y, M and C. The controller 6 is adapted to provide the color adjustment factors for the color adjusting factor circuit 3. The color adjustment according to the invention is accomplished by satisfying the following expression:

$$\begin{pmatrix} Y \\ M \\ C \end{pmatrix} = \begin{pmatrix} a_{11} + 2\alpha'_B + \alpha_G + \alpha_R & a_{12} - \alpha'_B + 2\alpha_G + \alpha_R & a_{13} - \alpha'_B + \alpha_G - 2\alpha_R \\ a_{21} - 2\alpha_B - \alpha_G + \alpha_R & a_{22} + \alpha_B + 2\alpha_G + \alpha_R & a_{23} + \alpha_B - \alpha'_G - 2\alpha_R \\ a_{31} - 2\alpha_B + \alpha_G - \alpha'_R & a_{32} + \alpha_B - 2\alpha_G - \alpha'_R & a_{33} + \alpha_B - \alpha_G + 2\alpha_R \end{pmatrix} \begin{pmatrix} B \\ G \\ R \end{pmatrix}$$

In order to maintain a gray copy (uncolored) of the original document, the color correction factors of $a_{11}$ through $a_{39}$ should satisfy the following expression with the input densities B, G, and R set to equivalent neutral density (END):

$a_{11} + a_{12} + a_{13} = 1$ $a_{21} + a_{22} + a_{23} = 1$ $a_{31} + a_{32} + a_{33} = 1$ $a_{14} + a_{15} + a_{19} = 0$ $a_{24} + a_{25} + a_{29} = 0$ $a_{34} + a_{35} + a_{39} = 0 \quad (6)$ On the other hand, the expression for $\Delta Y$, $\Delta M$, and $\Delta C$ can be rewritten as follows:

$$\begin{pmatrix} \Delta Y \\ \Delta M \\ \Delta C \end{pmatrix} = \begin{pmatrix} -\alpha_B & \alpha_G & \alpha_R \\ \alpha_B & \alpha_G & \alpha_R \\ \alpha_B & \alpha_G & \alpha_R \end{pmatrix} \begin{pmatrix} -(l_{31} + l_{32}) & l_{31} & l_{31} \\ l_{G1} & (l_{G1} - l_{G2}) & l_{G1} \\ l_{R1} & l_{R1} & (l_{R1} + l_{R2}) \end{pmatrix} \begin{pmatrix} B \\ G \\ R \end{pmatrix}$$

where $l_{31}$, $l_{32}$, $l_{G1}$, $l_{G2}$, $l_{R1}$ and $l_{R2}$ are constants replacing color correction factors $a_{11}$ through $a_{33}$. Therefore, $$D_B = -(l_{31}+l_{32})B + l_{31}G + l_{32}R$$

$$D_G = l_{G1}B - (l_{Gi}+l_{G2}) + l_{G2}R$$

$$D_R = l_{R1}B + l_{R2}G - (l_{R1}+l_{R2}) \quad (7)$$

The red, green and blue adjustment regions can be shifted by changing the constants in expression (7).

In the device thus arranged, the color separation signals of an original picture, after being subjected to necessary pretreatment such as shading correction and END conversion, are applied as input density signals B, G, and R, to the fundamental matrix masking circuit 1 and the decision output circuit 2. The fundamental matrix masking circuit 1 calculates the output densities $Y_0$, $M_0$ and $C_0$ which represent values before color adjustment of the picture. The decision output circuit 2 calculates the color decision output according to the above-described formula. The color decision outputs $D_B$, $D_G$ and $D_R$ are applied to the color adjusting masking circuit 4, where they are multiplied by the color correction factors $\alpha_B$, $\alpha_G$, $\alpha_R$, $\alpha'_B$, $\alpha'_G$ and $\alpha'_R$ to provide the color adjustments $\Delta Y$, $\Delta M$, and $\Delta C$. The color adjustments are then applied to the addition circuit 5, where they are added to the output densities $Y_0$, $M_0$, and $C_0$ outputted by the fundamental matrix masking circuit 1, respectively. Thus, the addition circuit 5 provides the output density signals Y, M, and C. In this manner, the color adjustment is accomplished.

Figure 2:
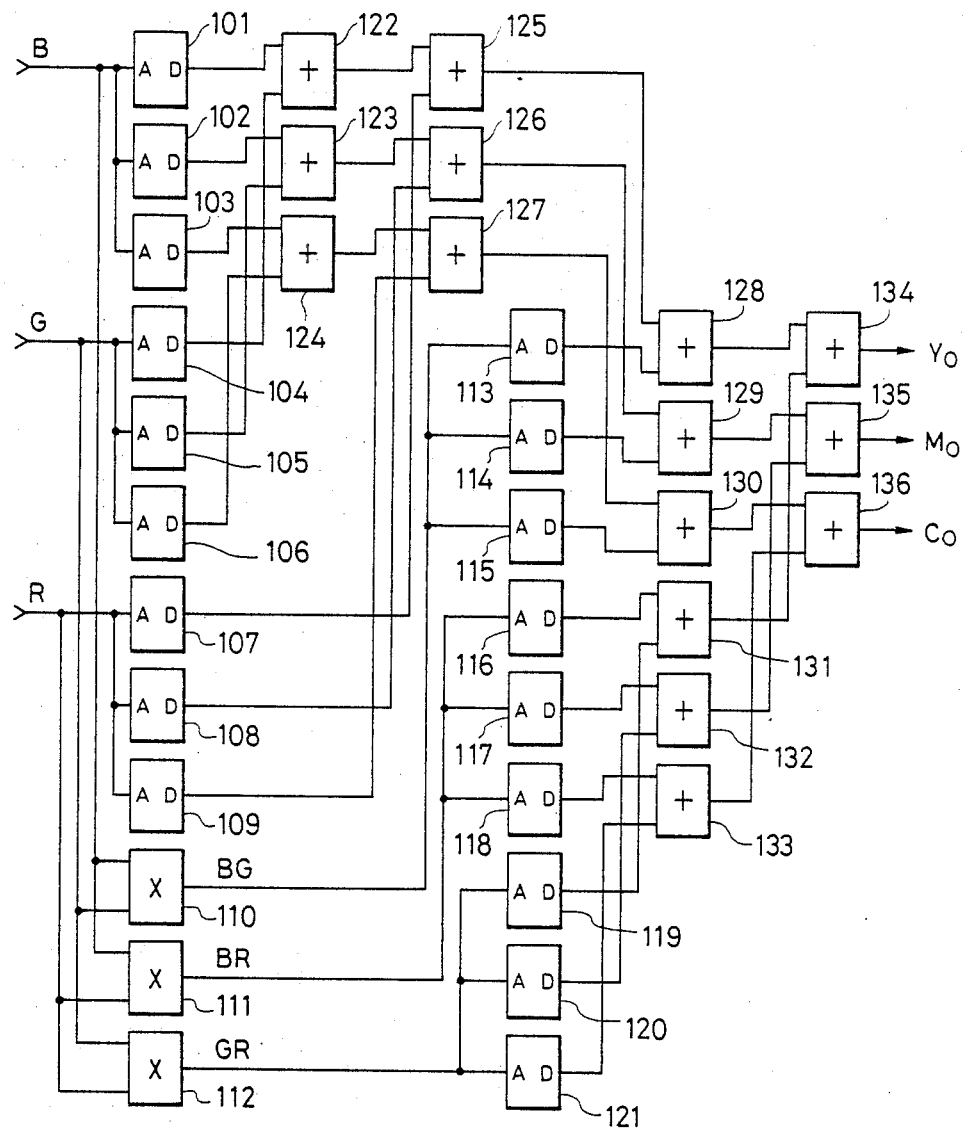
FIG. 2 is a block diagram illustrating the fundamental matrix masking circuit of FIG. 1 in greater detail.

The above-described fundamental matrix masking circuit 1 is shown in greater detail in FIG. 2. The circuit 1 includes memory tables 101 through 109, made up of read only memories (ROMs) for obtaining $a_{11}B + a_{17}B^2$ through $a_{33}R + a_{39}R^2$; multipliers 110 through 112 in which the signals B, G and R are multiplied by one another to provide the output signals BG, BR and GR; memory tables 113 through 121 for obtaining $a_{14}BG$ through $a_{36}RB$ according to the output signals of the multipliers 110 through 112; adders 122 through 124 in each of which two of the output signals of the memory tables 101 through 106 are added; adders 125 through 127 for adding the output signals of the aforementioned adders 122 through 124, respectively, to the output signals of the memory tables 107 through 109; adders 128 through 130 for adding the output signals of the adders 125 through 127, respectively, to the output signals of the memory tables 113 through 115; adders 131 through 133 for adding the output signals of the memory tables 116 through 118, respectively, to the output signals of the memory tables 119 through 121; and adders 134 through 136 for adding the output signals of the adders 128 through 130 to the output signals of the adders 131 through 133 to provide the output density signals $Y_0$, $M_0$ and $C_0$, respectively.

In the fundamental matrix masking circuit 1 of FIG. 2, $a_{11}B + a_{17}B^2$ through $a_{33}R + a_{39}R^2$ are obtained by the memory tables 101 through 109, and the matrix calculations of $a_{14}BG$ through $a_{36}RB$ which are performed by the memory tables 113 through 121. The output signals of these memory tables are applied to the adders 122 through 136 separately according to the colors, so that the density signals $Y_0$, $M_0$ and $C_0$ are provided.

Figure 3:
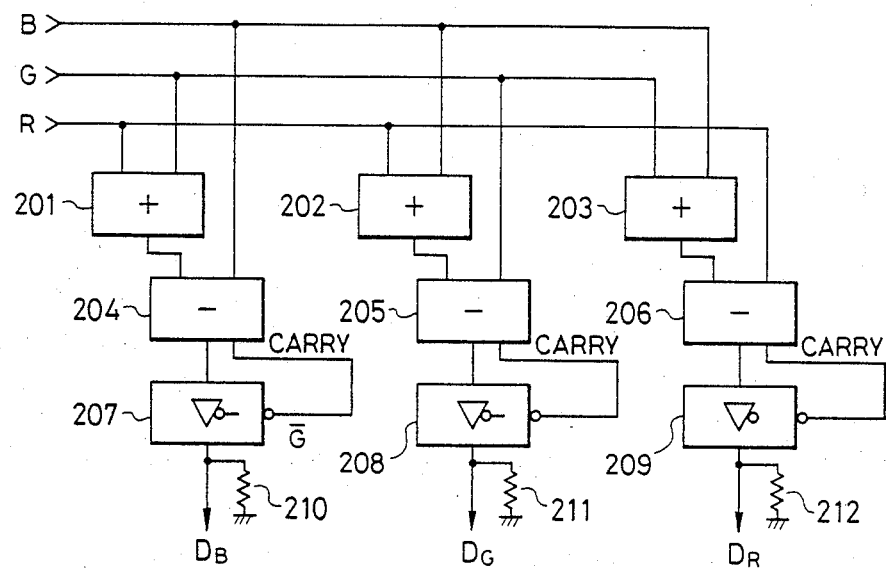
FIG. 3 is a block diagram illustrating the decision output circuit 2 of FIG. 1 in greater detail.

The decision output circuit 2 is shown in greater detail in FIG. 3 and includes an adder 201 for adding the input density signal G to the input density R; and adder 202 for adding the input density signal B to the input density signal R; an adder 203 for adding the input density B to the input density signal G; a subtractor 204 for subtracting 2B from the output signal of the adder 201 to obtain an output equal to $(G+R-2B)$; subtractors 205 and 206 for outputting $(B+R-2G)$ and $(B+G-2R)$; in the same manner as subtractor 204, respectively; buffers 207 through 209 for selectively outputting the output signals of the subtractors 204 through 206 with the aid of carry signals, respectively; and pull-down resistors 210 through 212 connected respectively between the output terminals of the buffers 207 through 209 and ground.

In the decision output circuit 2 of FIG. 3, the adder 201 and the subtractor 204 in combination provides $D_b = -2B + G + R$ required in the calculation of the above-described expression, the adder 202 and the subtractor 205 output $D_G = B - 2G + R$, and the adder 203 and the subtractor 206 calculate $D_R = B + G - 2R$. These decision outputs are applied to the buffers 207 through 209, respectively. In this operation, sign bits are applied to the output control terminals G of the buffers. Therefore, when the result of subtraction is negative, the output of the buffer 207 (or 208 or 209) is suppressed; that is, the output is zeroed by the effect of the pull-down resistor 210 (or 211 or 212); and when the result of subtraction is positive, $D_B$ (or $D_G$ or $D_R$) is outputted.

Figure 4:
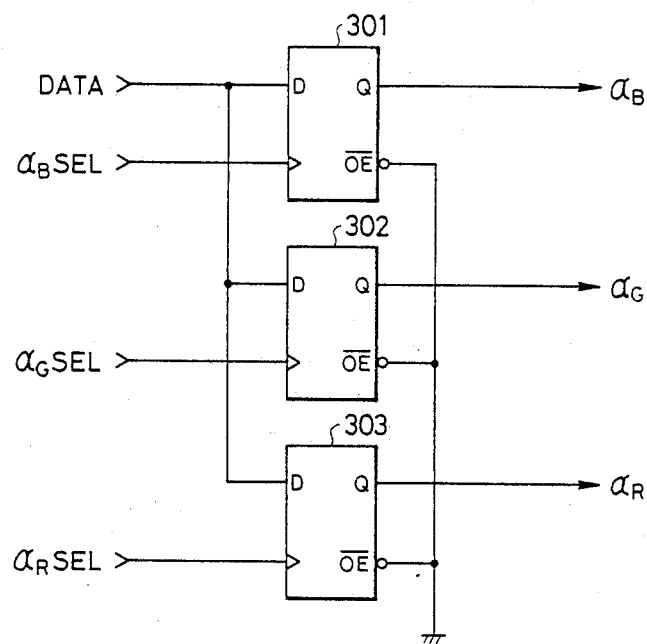
FIG. 4 is a block diagram illustrating the color adjusting factor circuit 3 of FIG. 1 in greater detail.

The color adjusting factor circuit 3 is shown in greater detail in FIG. 4 and includes latch circuits 301 through 303 which output the color adjustment factors through the Q terminals upon reception of a data signal and selection signals $\alpha$SEL.

In the circuit 3 thus organized, when the controller 6 outputs, for instance, the selection signals $\alpha_B$SEL, $\alpha_G$SEL, and $\alpha_R$SEL, a latch circuit from the group of circuits 301-303 outputs a high "H" level signal through its Q terminal under the condition that a "H" level signal has been applied to its D terminal. The "H" level signal thus outputted is $\alpha_B$, $\alpha_G$ or $\alpha_R$.

Figure 5:
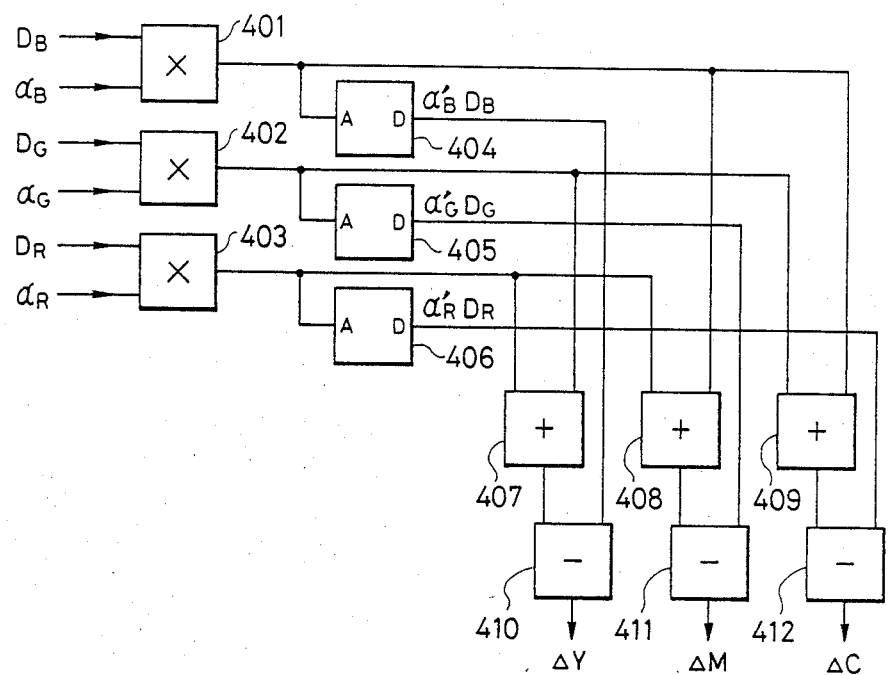
FIG. 5 is a block diagram illustrating the color adjusting masking circuit 4 of FIG. 1 in greater detail.

FIG. 5 illustrates the color adjusting masking circuit 4 in greater detail. The circuit 4 includes multipliers 401 through 403 in which the decision output signals $D_B$, $D_G$ and $D_R$ are multiplied by the color adjustment factors $\alpha_B$, $\alpha_G$ and $\alpha_R$, respectively; memory tables 404 through 406 for outputting values resulting from the multiplication of the outputs of multipliers 401-403 by a constant m; adders 407 through 409 each of which adds two of the output signals of the multipliers 401 through 403; and subtractors 410 through 412 in which the outputs of the memory tables 404 through 406 are subtracted from the outputs of the adders 407 through 409 to provide the color adjustments $\Delta Y$, $\Delta M$, and $\Delta C$, respectively.

In the color adjusting masking circuit 4 of FIG. 5, the multipliers 401 through 403 and memory tables 404 through 406 output $\alpha_B D_B$, $\alpha_G D_G$, $\alpha_R D_R$, $\alpha'_B D_B$, $\alpha'_G D_G$ and $\alpha'_R D_R$, respectively (where $\alpha'_B D_B = m\alpha_B D_B$; $\alpha'_G D_G = m\alpha_G D_G$; and $\alpha'_R D_R = m\alpha_R D_R$). The output signal of the multiplier 401 is applied to the adders 407 and 409, the output signal of the multiplier 402 is applied to the adders 407 and 408 and the output signal of the multiplier 403 is applied to the adders 408 and 409. Therefore, the adders 407 through 409 output $(\alpha_B D_B + \alpha_G D_G)$, $(\alpha_G D_G + \alpha_R D_R)$ and $(\alpha_R D_R + \alpha_B D_B)$, respectively. The output signals of the adders 407 through 409 are supplied to the subtractors 410 through 412, respectively, so that the output signals of the multipliers 404 through 406 are subtracted from the output signals of the adders 407 through 409, respectively. As a result, the subtractors 410 through 412 provide the following output signals which are the color adjustments $\Delta Y$, $\Delta M$ and $\Delta C$, respectively.

$$\Delta Y = -a'_B D_B + a_G D_G + a_R D_R$$

$$\Delta M = a_B D_B - a'_G D_G + a_R D_R$$

$$\Delta C = a_B D_B + a_G D_G - a'_R D_R$$

These color adjustments $\Delta Y$, $\Delta M$ and $\Delta C$ are applied to the addition circuit 5.

In general, the data $a_B$, $a_G$, $a_R$, $a'_B$, and $a'_R$ are each in a range of from $-1.0$ to $+1.0$. Therefore, the data are converted into suitable integers by multiplication of a power of two (2). The integers are applied to the latch circuits 301 through 303, as shown in FIG. 4, and the low-order bits of the outputs of the multipliers 401 through 403 are omitted for correction of the scale.

Figure 6:
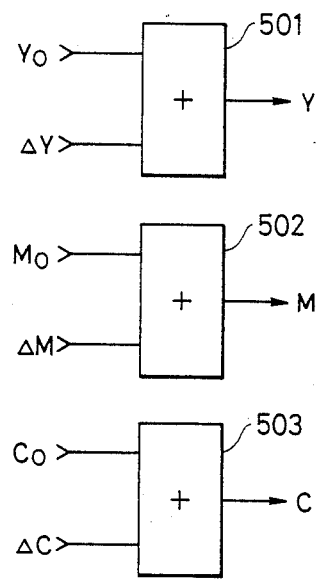
FIG. 6 is a block diagram illustrating the addition circuit 5 of FIG. 1 in greater detail.

The addition circuit 5 is shown in FIG. 6 in greater detail and includes adders 501 througuh 503 which add the output densities $Y_0$, $M_0$ and $C_0$ of the fundamental matrix masking circuit 1 to the color adjustment $\Delta Y$, $\Delta M$, and $\Delta C$ outputted by the color adjusting masking circuit 4 to provide the output density signals Y, M and C, respectively. That is, the adders 501 through 503 provide the color-adjusted output density signals $Y = Y_0 + \Delta Y$, $M = M_0 + \Delta M$ and $C = C_0 + \Delta C$, respectively.

Figure 7:
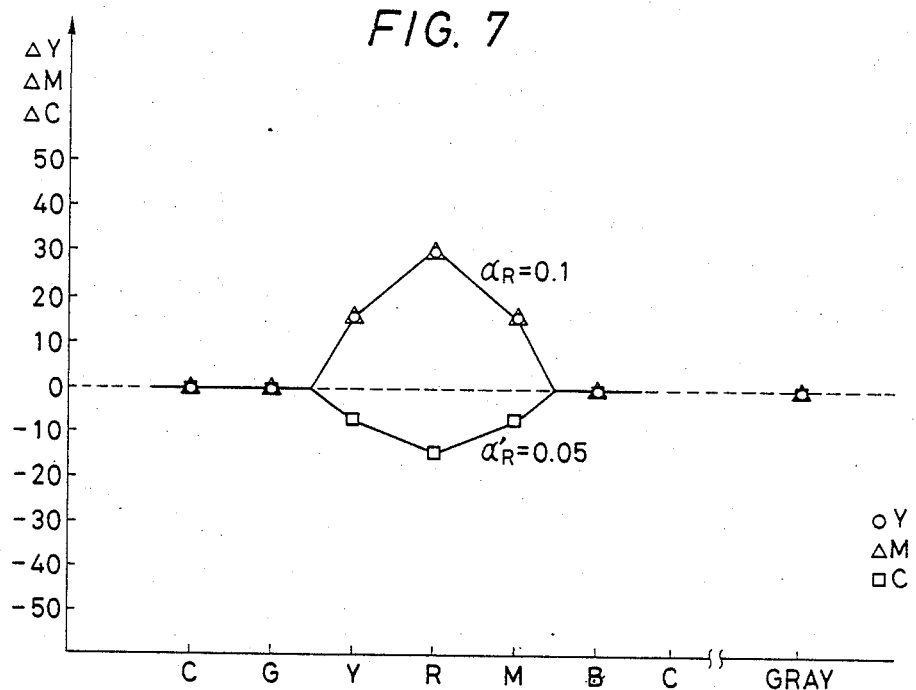
FIGS. 7, 8 and 9 are graphical representations indicating the color adjustment variation characteristics of red, green, and blue, respectively.
Figure 8:
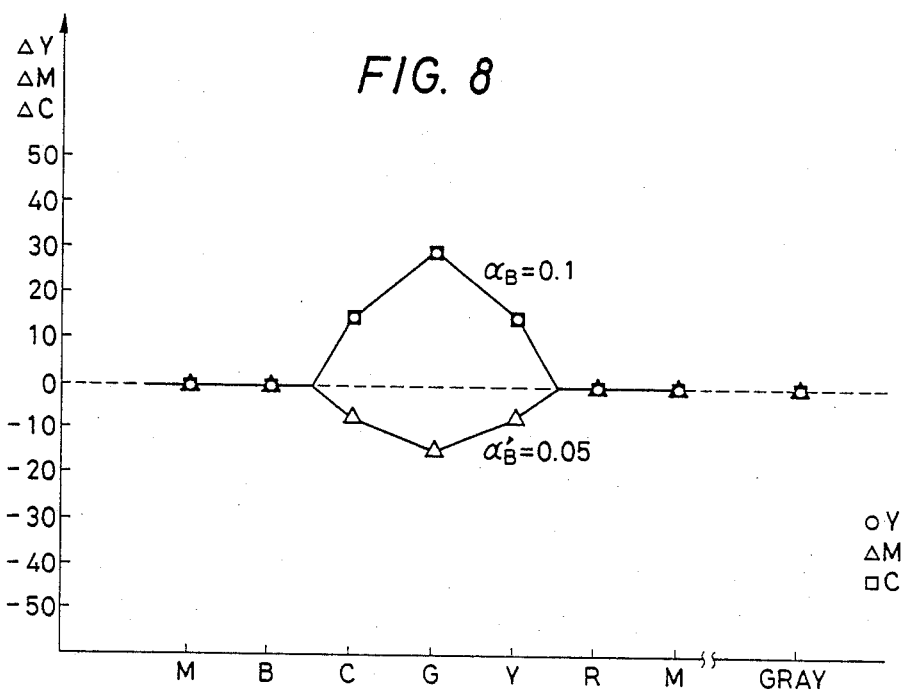
Figure 9:
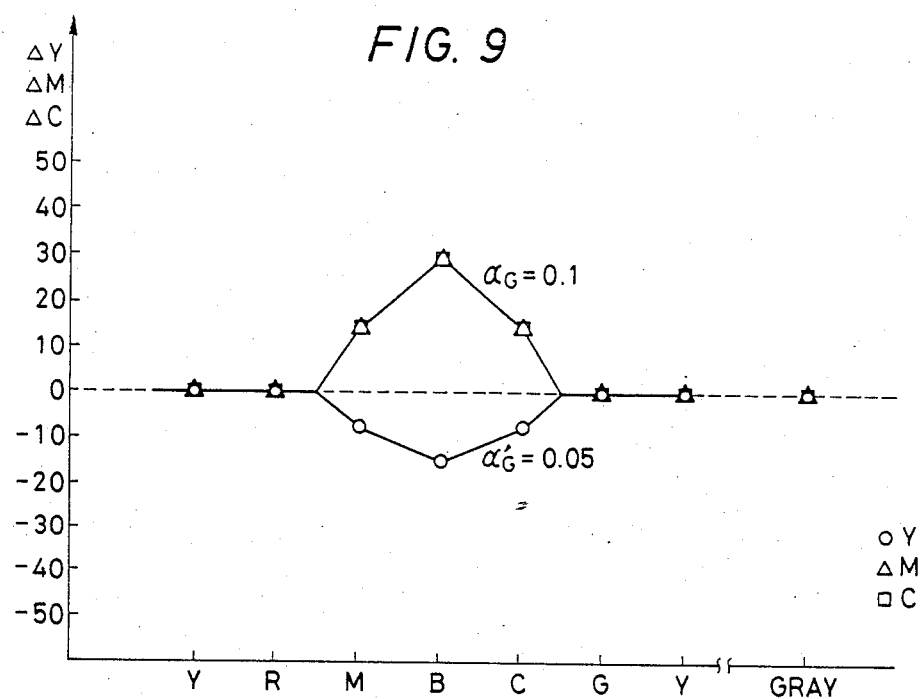
Figure 10:
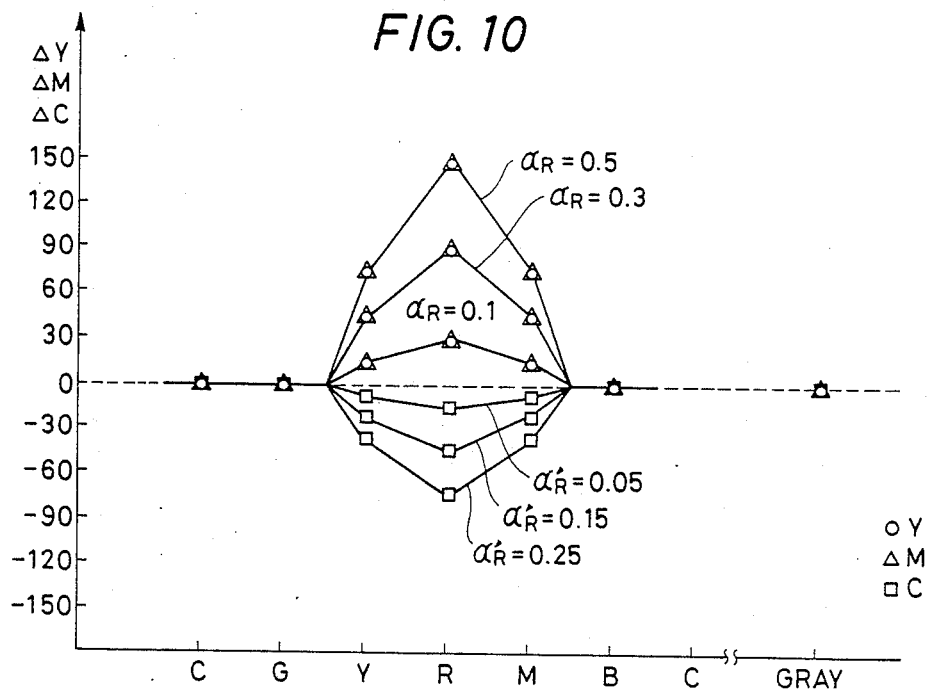
FIG. 10 is a graphical representation indicating the color adjustment variation characteristics as red color adjustment factors are increased and decreased.

In the following Table 1, the relationships between the adjustment ranges (color adjustment regions) and the adjustment magnitudes (color adjustment variations) provided by the color adjustment of the invention are indicated by numerical data. The input densities are indicated by values in the range of from 0 to 255. FIGS. 7, 8 and 9 are graphical representations indicating the color adjustment variation in Table 1 for a red color adjustment, green color adjustment, and blue color adjustment, respectively. FIG. 10 is also a graphical representation indicating the changes of the variations $\Delta Y$, $\Delta M$ and $\Delta C$ which are caused as the red color adjustment factors $a_R$ and $a'_R$ increase, respectively. It should be noted that in FIGS. 7-10, $m_B = m_G = m_R = 0.5$ and the values of $a_B$, $a_B$ and $a_R$ can be replaced by changing values of the constants $m_B$, $m_G$ and $m_R$.

When it is necessary to intensify the color, for instance to increase the red color adjustment, the red color correction factor $a_R$ should be increased, as shown in FIG. 7. In this case, Y and M, necessary for the reproduction of the color red can be increased, while C, unnecessary for reproduction of red, can be decreased, with the original of the picture maintained unchanged. The color adjustment variation for R is the largest; those for Y and R are half that required for R, and G, B and C are not changed at all. In order to intensity green or blue, a similar determination is performed.

It should be noted in the present invention that the color adjusting masking circuit 4 may be included into the fundamental matrix masking circuit 1. This modification can be achieved for instance as follows. Random Access Memories (RAMs) can be employed as the memory tables 101 through 109 and 113 through 121 shown in FIG. 2, and the sign bit output of the subtractors 204 through 206 shown in FIG. 3 can be applied to the address lines of the memories, and eight different operation tables for performing color adjustment for the colors (B, G and R) can be written into the RAMs.

As is apparent from the above description, in the color adjusting device of the invention for each of the colors red, green and blue, the two kinds of color adjustment factors, $a$ and $a'$ are employed to calculate the color adjustments, and the color adjustments are then used to correct the output densities which are provided before the color adjustment. Therefore, for each color, the adjustment of the color necessary (for instance in the color adjustment of the color red, an increase or decrease of Y and M is necessary) and the adjustment of the color which is unnecessary (for instance in the color adjustment of the color red, an increase or decrease of C is not necessary) can be carried out. That is, six different adjustments are performed in order to accomplish the color adjustment according to the invention.

It will be apparent to those skilled in the art that various modifications and variations can be made in the color adjusting device in the present invention without departing from the scope or spirit of the invention. Thus, it is intended that the present invention cover the modifications and variations of this invention provided they come within the scope of the appended claims and their equivalents.

What is claimed is:

1. A color adjusting device, for adjusting the colors in an original picture, said colors of said original picture being separated to obtain input color separation signals, said device comprising:
    matrix masking circuit means for performing matrix masking on said input color separation signals to obtain non-color-adjusted output density signals of said colors of said original picture;
    decision output circuit means for performing an addition operation on said input color separation signals and for performing a subtraction operation on said color separation signals to output a plurality of color decisions representing the presence of regions of color in said original picture;
    color adjusting factor circuit means for outputting, for each of said colors, a first adjustment to increase the density of a predetermined color and a

TABLE 1

| Color of Original | Input Density | | | Color Adjustment Variation in Intensifying Red | | | Color Adjustment Variation in Intensifying Green | | | Color Adjustment Variation in Intensifying Blue | | |
|---|---|---|---|---|---|---|---|---|---|---|---|---|
| | B | G | R | Y | M | C | Y | M | C | Y | M | C |
| (B) | 50 | 200 | 200 | 0 | 0 | 0 | 0 | 0 | 0 | −15 | 30 | 30 |
| (C) | 50 | 50 | 200 | 0 | 0 | 0 | 15 | −7.5 | 15 | −7.5 | 15 | 15 |
| (G) | 200 | 50 | 200 | 0 | 0 | 0 | 30 | 15 | 30 | 0 | 0 | 0 |
| (Y) | 200 | 50 | 50 | 15 | 15 | −7.5 | 15 | −7.5 | 15 | 0 | 0 | 0 |
| (R) | 200 | 200 | 50 | 30 | 30 | 15 | 0 | 0 | 0 | 0 | 0 | 0 |
| (M) | 50 | 200 | 50 | 15 | 15 | −7.5 | 0 | 0 | 0 | −7.5 | 15 | 15 |
| Gray | 150 | 150 | 150 | 0 | 0 | 0 | 0 | 0 | 0 | 0 | 0 | 0 |

($m_B = m_G = m_R = 0.5$)

second adjustment to decrease the density of a predetermined color, respectively;

a color adjusting masking circuit means, for performing a mathematical calculation in response to signals from said color adjusting factor circuit means and said decision output circuit means to obtain a color adjustment change for each of said colors; and adder circuit means for adding the outputs of said matrix masking circuit to the outputs of said color adjusting masking circuit means to provide output density signals of said colors of a color-adjusted picture.

2. The device of claim 1, wherein said matrix masking circuit means includes:

a first plurality of memory means for storing a predetermined combination of input color separation signals and a plurality of color correction factors;

a plurality of multiplier means for multiplying predetermined combinations of said input color separation signals to provide multiplier output signals;

a second plurality of memory means for storing a predetermined combination of said multiplier output signals and a plurality of color correction factors;

a first plurality of matrix masking adder circuit means for adding predetermined combinations of a plurality of outputs from said first plurality of memory means;

a second plurality of matrix masking adder circuit means for adding predetermined combinations of a plurality of outputs from said first plurality of matrix masking adder circuit means with a plurality of outputs of said second plurality of memory means;

a third plurality of memory means each for storing one of said multiplier output signals;

a third plurality of matrix masking adder circuit means for adding predetermined combinations of a plurality of outputs from said second plurality of matrix masking adder circuit means with a plurality of outputs of said third plurality of memory means;

a fourth plurality of matrix masking adder circuit means for adding predetermined combinations of the outputs of said second plurality of memory means; and a fifth plurality of matrix masking adder circuit means for adding predetermined combinations of a plurality of outputs of said third plurality of matrix masking adder circuit means to a plurality of outputs of said fourth plurality of matrix masking adder circuit means to provide said output density signals of said colors of said original picture.

3. The device of claim 1, wherein said decision output circuit means includes:

a plurality of decision adder circuit means for adding predetermined combinations of said input color separation signals;

a plurality of subtracter circuit means for subtracting combinations wherein a value of double the amount of a predetermined one of said input color separation signals is subtracted from a predetermined one of a plurality of outputs of said plurality of decision adder circuit means; and a plurality of buffer circuit means each for outputting a color decision in response to an output from one of said plurality of subtracter circuit means and in response to a carry signal.

4. The device of claim 1, wherein said color adjusting masking circuit means includes:

a plurality of multiplier means for multiplying respective ones of a plurality of outputs of said decision output circuit means by respective ones of the outputs of said color adjusting factor circuit means;

a plurality of memory table means for outputting values resulting from the multiplication of a plurality of outputs of said plurality of multiplier means by a predetermined constant value;

a plurality of color adjusting adder circuit means for adding predetermined combinations of the outputs of said plurality of multiplier means; and a plurality of subtractor circuit means for performing a respective subtraction operation wherein a predetermined output of one of said plurality of multiplier means is subtracted from a predetermined output of one of said color adjusting adder circuit means.

5. A method of color adjustment comprising the steps of:

(a) subjecting color separation signals of an original picture to matrix masking by setting color adjustment factors of the color separation signals equal to the absolute value of the sum of the color adjustment factors corresponding to the other color separation signals but of opposite polarity; and (b) computing color adjustments through use of a mathematical formula utilizing color data of the original picture and preset color adjustment factors.

* * * * *